Figure 1:
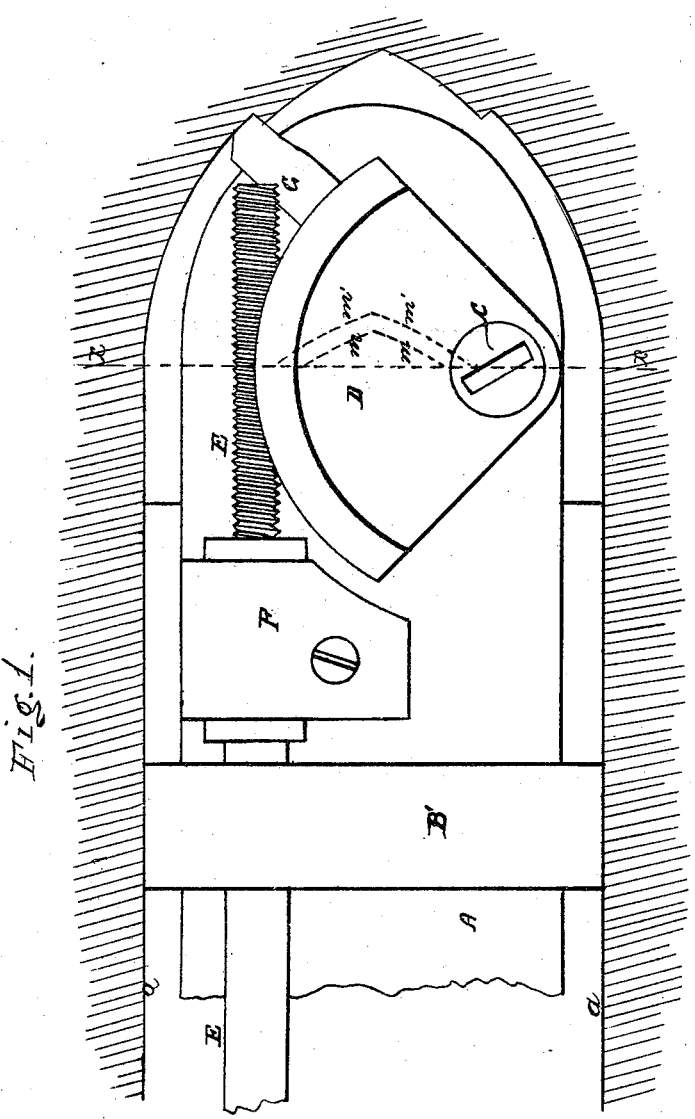

W. McCLEERY.
Boring Ordnance Chambers.

No. 42,332

2 Sheets—Sheet 1

Patented Apr. 12, 1864.

Witnesses

Inventor.

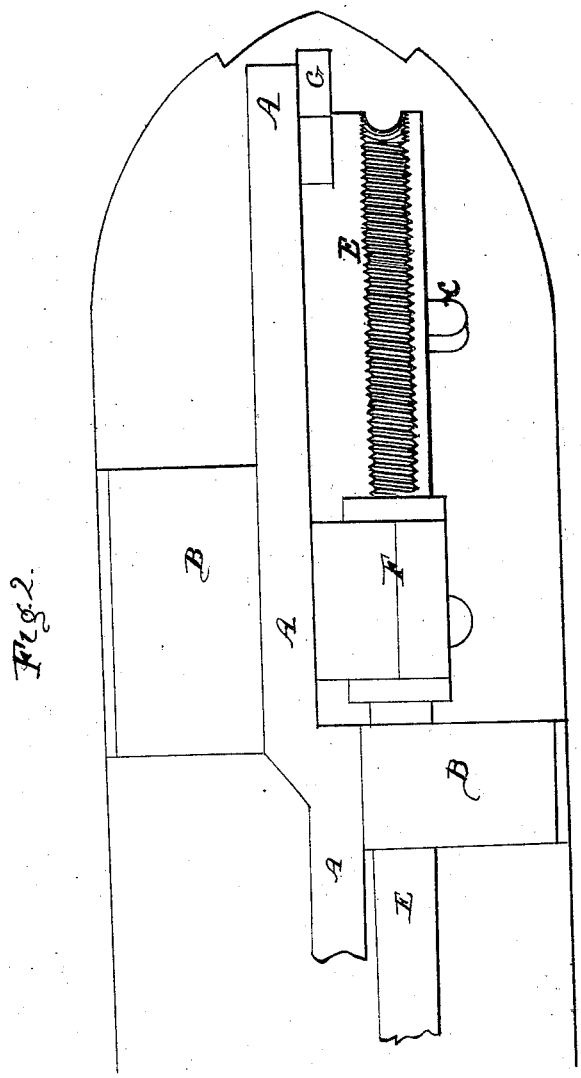

UNITED STATES PATENT OFFICE.

WILLIAM McCLEERY, OF PITTSBURG, ASSIGNOR TO SEYFERT, McMANUS & CO., OF READING, PENNSYLVANIA.

IMPROVEMENT IN MACHINES FOR BORING THE CHAMBERS OF CANNON.

Specification forming part of Letters Patent No. 42,332, dated April 12, 1864.

*To all whom it may concern:*

Be it known that I, WILLIAM McCLEERY, of Pittsburg, Pennsylvania, have invented a Tool for Boring Out the Chambers of Cannon; and I do hereby declare the following to be a full, clear, and exact description of the same, reference being had to the accompanying drawings, and to the letters of reference marked thereon.

My invention consists of a tool, fully described hereinafter, for boring out the chambers at the rear of the bores of cannon.

In order to enable others skilled in the art to make and use my invention, I will now proceed to describe its construction and operation.

On reference to the accompanying drawings, which form a part of this specification, Figure 1 is a face view of my improved tool for boring out the chambers of cannon, and Fig. 2 an edge view of the same.

A represents the end portion of a bar, such as is used for boring out cannon, and to this bar are secured the two steadying-blocks B and B'—one being situated on each side of the bar—and the two blocks fitting to the bore of the gun, which is represented by the red lines $a$ $a$. A pin, C, passes through and is secured to the boring-bar A near one edge of the same, and to this pin is hung the segment D of a worm-wheel, the teeth on the edge of which are adapted to the screw-thread on the shaft E, the latter turning in a suitable box, F, secured to the bar A and passing through the steadying-block B'. A cutting-tool, $c$, is so secured to a recess in the segment G as to turn with the latter. It should be understood that the shaft E is of such a length that its outer end, which is furnished with a suitable handle, shall extend beyond the muzzle of the cannon at all times, and that the shaft is supported by and turns in suitable bearings attached to the bar A, in addition to the bearing F.

The above-described tool is especially adapted to the boring out and finishing of the chambers at the rear of the bore of the cannon, and is applied as follows: When the cannon has been bored as far as the dotted line $x$, the above tool is introduced, and is adjusted to such a position that a portion—such, for instance, as is represented by the red lines $m$ $m$—is cut away from the solid rear of the bore by means of the tool G, which, by turning the shaft E, is made to describe the segment of a circle of which the pin C is the center, the shaft E being turned at intervals as the cannon revolves round the stationary bar A. After a portion has been cut away from the rear end of the bore, the bar is advanced to a limited extent and another cut—such, for instance, as is represented by the red lines $m'$—is made by causing the cutter G to move in the arc of a circle, as before, while the cannon revolves. Thus the bar is advanced from time to time, and cut after cut is made, until the rear end of the bore or chamber of the gun is reduced to the desired form, the tool being represented in the drawings as making the best cut.

I wish it to be understood that I do not desire to claim, broadly, the use of a cutter-holder capable of a partial revolution on its axis in the plane of the axis of the cannon to be acted on, operating as a feed-motion to advance the point of the cutting-tool in a curved line toward the axis of the cannon, as this device is described in the patent of Abraham Alexander, October 16, 1863; but

I claim as my invention and desire to secure by Letters Patent—

The segment D of a worm-wheel, with its cutter G and the screwed shaft E, the whole being combined with the boring-bar A and applied to the finishing of the chambers of cannon, substantially as and for the purpose herein set forth.

In testimony whereof I have signed my name to this specification in the presence of two subscribing witnesses.

WILLIAM McCLEERY.

Witnesses:
HUGH McMILLEN,
JOHN A. CREIGHTON.